(12) United States Patent
Holland

(10) Patent No.: US 7,047,659 B2
(45) Date of Patent: May 23, 2006

(54) MULTI-TASK PROMOTIONAL APPARATUS

(75) Inventor: Jason S. Holland, Raleigh, NC (US)

(73) Assignee: Adstracts, Inc., Raleigh, NC (US)

( * ) Notice: Subject to any disclaimer, the term of this patent is extended or adjusted under 35 U.S.C. 154(b) by 0 days.

(21) Appl. No.: 10/835,880

(22) Filed: Apr. 30, 2004

(65) Prior Publication Data

US 2005/0241172 A1    Nov. 3, 2005

(51) Int. Cl.
*G01B 3/10* (2006.01)
(52) U.S. Cl. .............................. 33/760; 33/743; 33/471; 33/555.4
(58) Field of Classification Search .......... 33/755–761, 33/743, 764, 768–769, 452, 465, 471, 534, 33/555.1, 555.4, 1 N, 514.1, 514.2, 1 PT
See application file for complete search history.

(56) References Cited

U.S. PATENT DOCUMENTS

| | | | | | |
|---|---|---|---|---|---|
| 1,585,563 | A | * | 5/1926 | Schlattau | 33/471 |
| 2,240,753 | A | * | 5/1941 | Tremblay et al. | 33/764 |
| 3,003,244 | A | * | 10/1961 | Fogliano | 33/341 |
| 3,407,507 | A | * | 10/1968 | Brubaker | 33/555.4 |
| 3,522,657 | A | * | 8/1970 | Metrulis | 33/342 |
| 3,568,322 | A | * | 3/1971 | Showers | 33/332 |
| 3,885,314 | A | * | 5/1975 | Banas, Sr. | 33/27.03 |
| 4,281,461 | A | * | 8/1981 | Roe | 33/760 |
| 4,697,349 | A | * | 10/1987 | Lee | 33/27.03 |
| D312,795 | S | * | 12/1990 | Fugett | D10/62 |
| 4,974,329 | A | * | 12/1990 | Willa | 33/391 |
| 5,077,910 | A | * | 1/1992 | Smith | 33/760 |
| 5,163,228 | A | * | 11/1992 | Edwards et al. | 33/1 N |
| 5,193,287 | A | * | 3/1993 | Coulter et al. | 33/555.4 |
| 5,253,655 | A |   | 10/1993 | Stone et al. | |
| 5,269,069 | A | * | 12/1993 | Min | 33/514.1 |
| 5,337,487 | A | * | 8/1994 | Mangino, Sr. | 33/760 |
| 5,371,949 | A | * | 12/1994 | Delaurier | 33/1 G |
| 5,430,952 | A | * | 7/1995 | Betts | 33/760 |
| 5,492,322 | A | * | 2/1996 | Smith | 33/389 |
| 5,529,489 | A | * | 6/1996 | Herrera | 33/555.4 |
| 5,613,302 | A | * | 3/1997 | Berman et al. | 33/514.2 |
| 5,809,662 | A | * | 9/1998 | Skinner | 33/768 |
| 6,233,789 | B1 | * | 5/2001 | Douglas | 24/3.12 |
| 6,253,459 | B1 | * | 7/2001 | Barnhill | 33/514.1 |
| 6,553,631 | B1 | * | 4/2003 | Douglas | 24/3.12 |

(Continued)

OTHER PUBLICATIONS

"Plastic 180° Pocket Goniometer," www.wisdomking.com/product55238.html.

*Primary Examiner*—Yaritza Guadalupe
(74) *Attorney, Agent, or Firm*—Myers Bigel Sibley & Sajovec

(57) ABSTRACT

A promotional apparatus includes a housing having first and second openings and an elongated slot formed therein. A first measuring tape is disposed within the housing, and is retractably extendable from the housing via the first opening. A second measuring tape is disposed within the housing. A first end of the second measuring tape is fixed to the housing and an opposite second end of the measuring tape is movable within the housing such that a portion of the second measuring tape between the first and second ends thereof extends from the housing via the second opening and forms a loop that is retractably expandable and that is configured to measure a circumference of an object. A goniometer is pivotably secured to the housing and is movable between a stored position and a plurality of operative positions that allow measurement of angles of movement of patient limbs, joints, etc.

28 Claims, 9 Drawing Sheets

U.S. PATENT DOCUMENTS

| | | | |
|---|---|---|---|
| 6,578,274 B1 * | 6/2003 | Tango et al. | 33/1 G |
| 6,658,755 B1 * | 12/2003 | Arlinsky | 33/760 |
| 6,694,622 B1 * | 2/2004 | Kim | 30/293 |
| D488,729 S * | 4/2004 | Golaszewski et al. | D10/62 |
| 6,789,329 B1 * | 9/2004 | Hester | 33/760 |
| 6,817,110 B1 * | 11/2004 | Bohnengel | 33/555.4 |
| 2002/0014017 A1 | 2/2002 | Egan | |
| 2004/0172846 A1 * | 9/2004 | McRae | 33/760 |

* cited by examiner

MULTI-TASK PROMOTIONAL APPARATUS

FIELD OF THE INVENTION

The present invention relates generally to product and service promotion and, more particularly, to the promotion of healthcare-related products and services.

BACKGROUND OF THE INVENTION

The use of promotional items has proliferated in today's increasingly competitive marketplace, where companies are constantly seeking new and more effective ways to market their products and services. In the healthcare industry, physicians and other healthcare providers often receive promotional articles from vendors of healthcare-related products, such as pharmaceutical products. These promotional articles often include "everyday" items, such as writing pads, calendars, and pens, and typically have promotional information (indicia) printed thereon. For example, pharmaceutical companies often provide physicians with writing pens and pads having the name of a particular pharmaceutical product printed thereon with the hopes that the pens and pads, when used, will help remind physicians to prescribe the pharmaceutical product.

Unfortunately, often because of lack of distinctiveness, many promotional articles provided to healthcare providers become "lost-in-the-shuffle" with other promotional articles. Thus, there is an ongoing need for distinctive, more effective promotional products directed to healthcare providers as well as to others.

SUMMARY OF THE INVENTION

In view of the above discussion, a promotional apparatus, according to embodiments of the present invention, includes a housing having an opening. A measuring tape is disposed within the housing and is retractably extendable from the housing via the opening. A goniometer is pivotably secured to the housing and is movable between a stored position and a plurality of operative positions that facilitate measurement of angles of movement of patient limbs, joints, etc. Promotional indicia is preferably disposed on one or more portions of the apparatus.

According to other embodiments of the present invention, a promotional apparatus includes a housing having first and second openings and an elongated slot formed therein. A first measuring tape is disposed within the housing, and is retractably extendable from the housing via the first opening. A second measuring tape is disposed within the housing. A first end of the second measuring tape is fixed to the housing and an opposite second end of the measuring tape is movable within the housing such that a portion of the second measuring tape between the first and second ends thereof extends from the housing via the second opening and forms a loop that is retractably expandable and that is configured to measure the circumference of objects (e.g., fingers, joints, etc.). Promotional indicia is preferably disposed on one or more portions of the apparatus.

According to other embodiments of the present invention, a promotional apparatus includes a housing having an opening and an elongated slot formed therein. A goniometer is pivotably secured to the housing and is movable between a stored position and a plurality of operative positions that facilitate measurement of angles of movement of patient limbs, joints, etc. A measuring tape is disposed within the housing. A first end of the measuring tape is fixed to the housing and an opposite second end is movable within the housing such that a portion of the measuring tape between the first and second ends extends from the housing via the second opening and forms a loop that is retractably expandable and that is configured to measure circumferences of objects. Promotional indicia is preferably disposed on one or more portions of the apparatus.

According to other embodiments of the present invention, a promotional apparatus includes a housing having first and second openings and an elongated slot formed therein. A first measuring tape is disposed within the housing, and is retractably extendable from the housing via the first opening. A second measuring tape is disposed within the housing. A first end of the second measuring tape is fixed to the housing and an opposite second end of the measuring tape is movable within the housing such that a portion of the second measuring tape between the first and second ends thereof extends from the housing via the second opening and forms a loop that is retractably expandable and that is configured to measure a circumference of an object. An actuator is slidably disposed within the slot and is movable along the slot. The actuator is attached to the second measuring tape second end. Movement of the actuator along the slot by a user retracts and expands the loop to facilitate measuring object circumferences. A goniometer is pivotably secured to the housing and is movable between a stored position and a plurality of operative positions that facilitate measurement of angles of movement of patient limbs, joints, etc. The goniometer includes an arm that has a proximal end pivotably secured to the housing and a distal free end. The arm is rotatable about a first axis within a range of angular positions. Angle scale indicia is disposed on the housing, and a pointer extends from the housing adjacent the angle scale indicia. The pointer is rotatable about a second axis and is operably connected with the arm such that pivotal movement of the arm causes rotational movement of the pointer and such that the pointer indicates angular displacement of the arm via the angle scale indicia.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
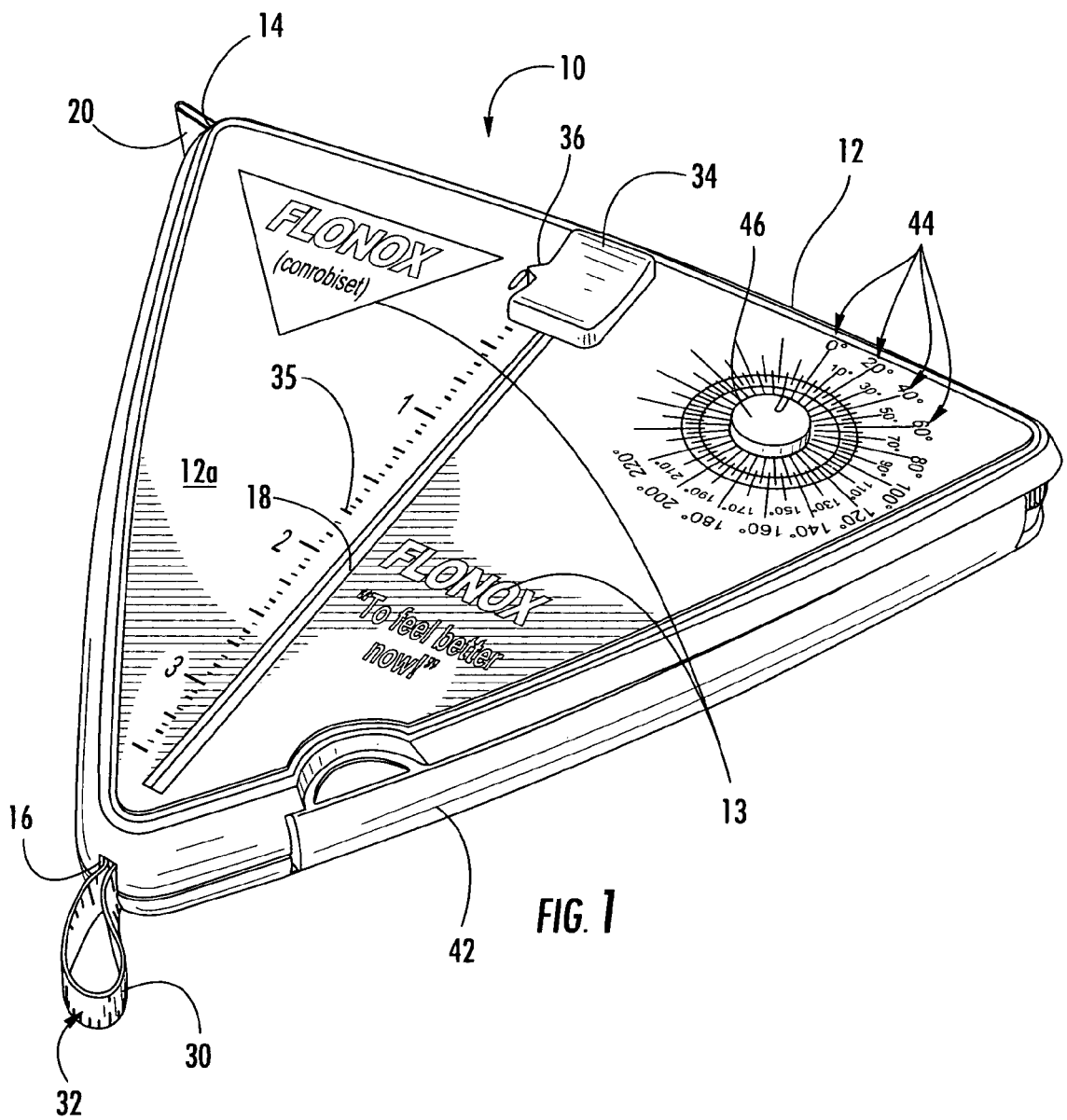
FIG. 1 is a perspective view of a promotional apparatus, according to an embodiment of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

The terms "upwardly", "downwardly", "vertical", "horizontal" and the like are used herein for the purpose of explanation only.

As used herein, phrases such as "between X and Y" and "between about X and Y" should be interpreted to include X and Y.

As used herein, phrases such as "between about X and Y" mean "between about X and about Y."

As used herein, phrases such as "from about X to Y" mean "from about X to about Y."

As used herein, the term "and/or" includes any and all combinations of one or more of the associated listed items.

Referring now to FIG. 1, an apparatus 10 according to an embodiment of the present invention is illustrated. The illustrated apparatus 10 includes a housing 12 having first and second openings 14, 16 and an elongated slot 18 formed therein. The illustrated housing 12 has a generally triangular shape with slightly arcuate sides. However, embodiments of the present invention are not limited to the illustrated housing shape. The housing 12 may have virtually any shape and configuration. For example, the housing 12 may have any polygonal or curvilinear shape including shapes having straight sides, curved sides, and/or combinations of straight and curved sides. In addition, the housing 12 may have the shape of a particular pharmaceutical tablet, pill, capsule, etc.

In the illustrated embodiment, promotional indicia 13 is disposed on the front housing surface 12a. Various types of promotional indicia including, but not limited to, lettering, designs, characters, logos and other symbols, may be utilized in accordance with embodiments of the present invention. The term "lettering" as used herein includes, but is not limited to, alphabetical characters and alphanumeric characters. Moreover, promotional indicia may be utilized virtually anywhere on the apparatus 10 (including housing 12 and other elements of the apparatus 10 illustrated and described herein). Embodiments of the present invention are not limited to the illustrated location and configuration of promotional indicia 13.

Figure 5:
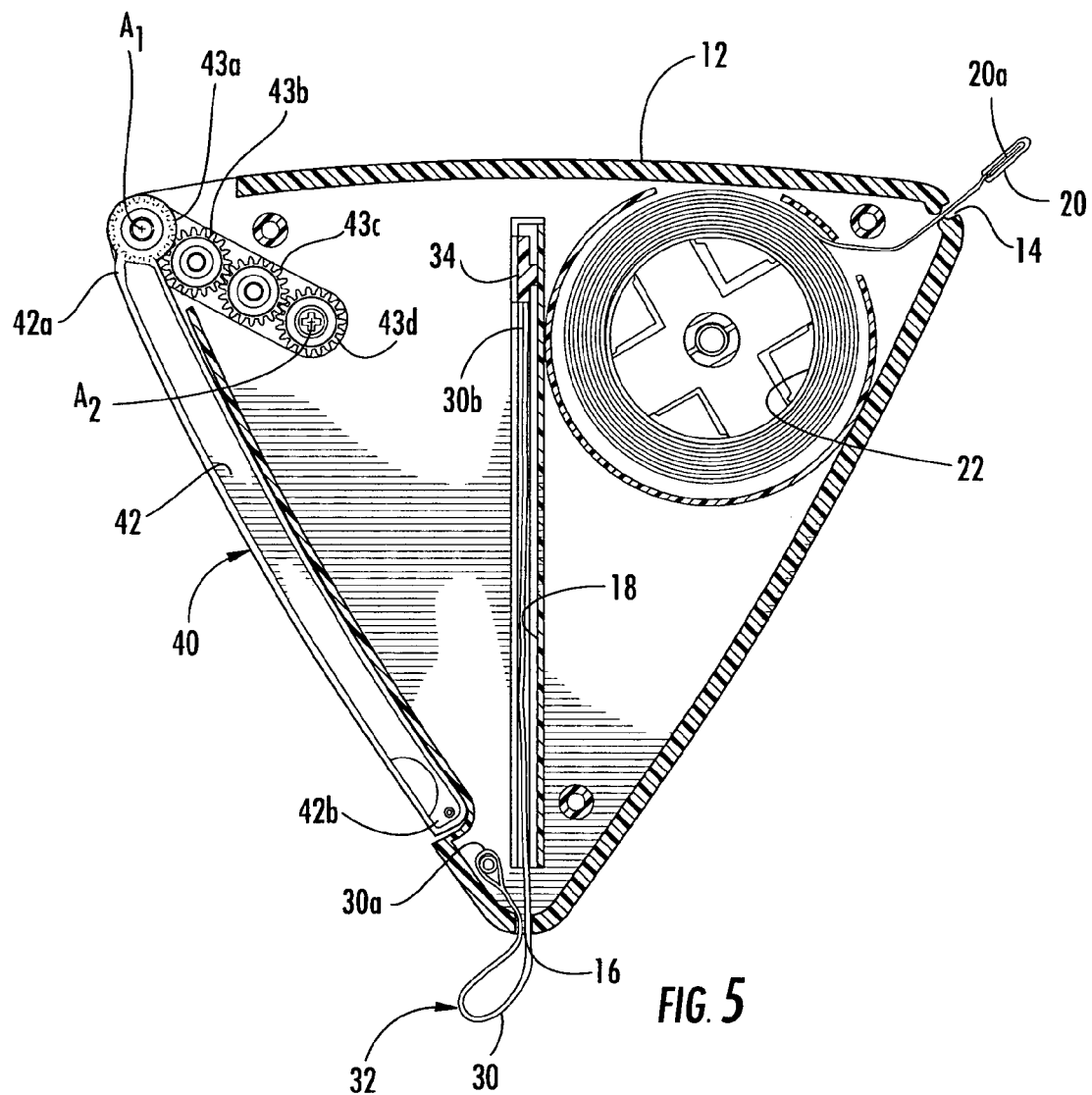
FIG. 5 is a front plan view of the apparatus of FIG. 1 with a front portion of the housing removed and that illustrates the internal arrangement of the various components of the apparatus, according to embodiments of the present invention.
Figure 6:
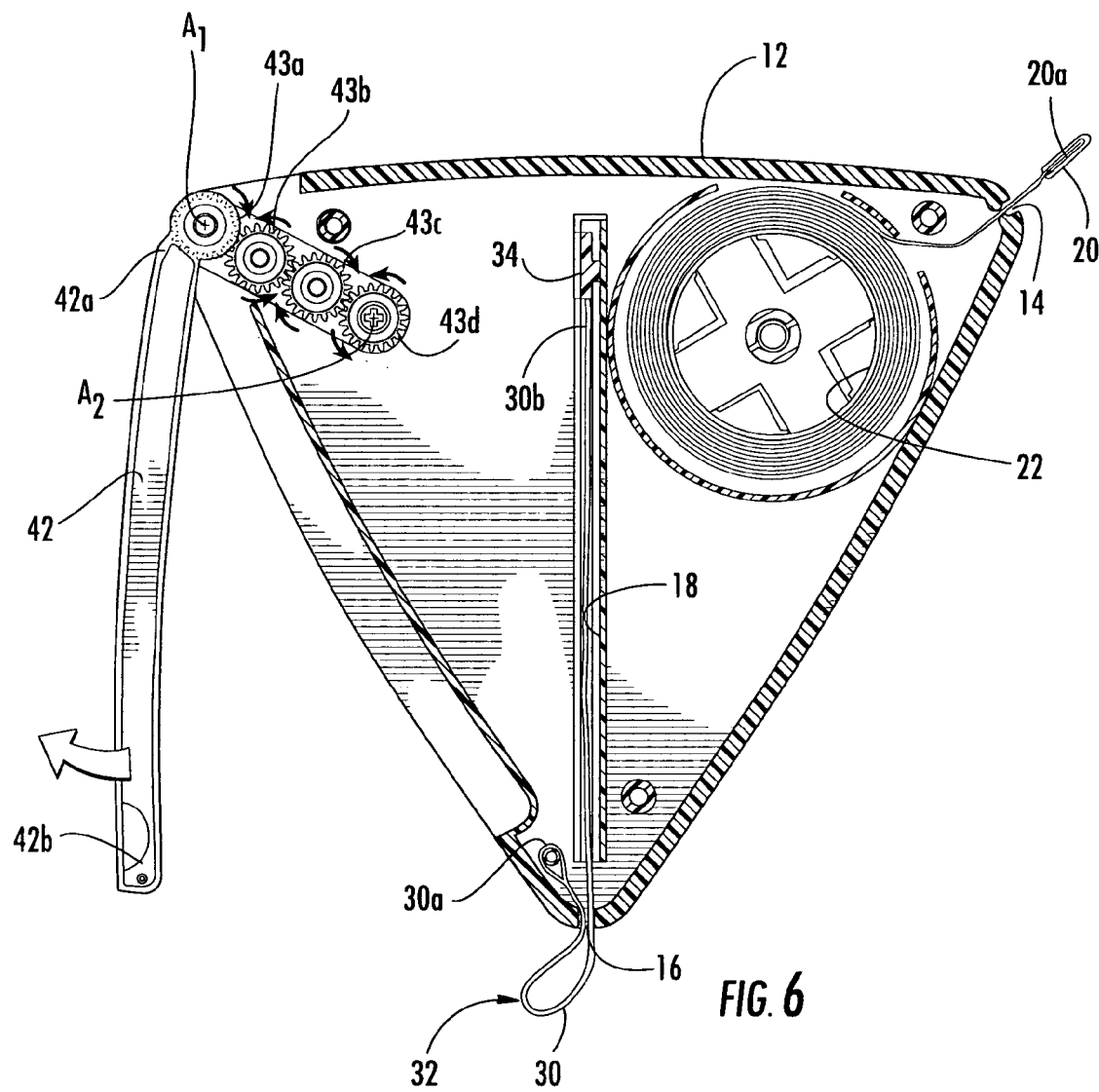
FIG. 6 is a front plan view of the apparatus of FIG. 1 with a front portion of the housing removed that illustrates the goniometer arm in an operative configuration, according to embodiments of the present invention.
Figure 7:
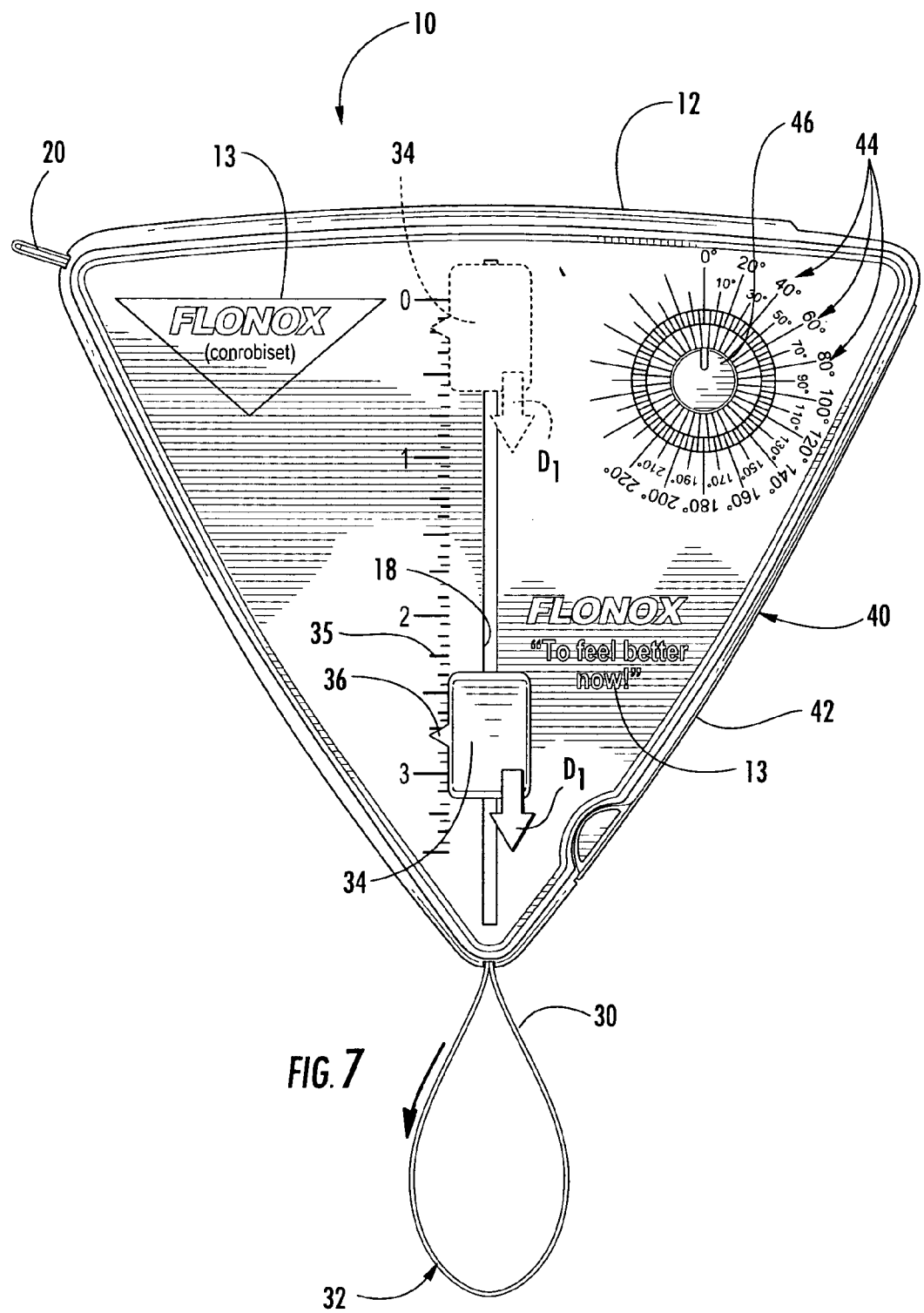
FIG. 7 is a front plan view of the apparatus of FIG. 1 that illustrates operation of the measuring tape loop, according to embodiments of the present invention.

In the illustrated embodiment, a first measuring tape 20 is disposed within the housing 12 and is retractably extendable from the housing 12 via the first opening 14. The first measuring tape 20 may have virtually any length, width, style, color, measuring units, etc. and is intended for any use that a conventional tape measure may be utilized for. As illustrated in FIG. 5, the first tape measure 20 is wound about a spool 22 that is rotatably secured within the housing 12. A free end 20a of the first tape-measure 20 extends from the housing 12 via opening 14. The free end 20a has a thickness greater than a width of the opening 14 such that the free end 20a remains exposed when the first measuring tape 20 is retracted back into the housing 12, as would be understood by those skilled in the art. In the illustrated embodiment, the spool 22 is biased by a spring (not illustrated) such that the first measuring tape 20, when extended (FIG. 8), automatically retracts into the housing 12 and around the spool 22 when a user presses release button 24 (FIG. 9), as would be understood by those skilled in the art.

In the illustrated embodiment, a second measuring tape 30 is disposed within the housing 12. A first end 30a of the second measuring tape 30 is fixed within the housing 12 (FIG. 5) and an opposite second end 30b of the measuring tape 30 is movable within the housing 12 such that a portion of the second measuring tape 30 between the first and second ends 30a, 30b extends from the housing 12 via the second opening 16 and forms a loop 32 that is retractably expandable and that is configured to measure a circumference of an object. The second measuring tape loop 32 may be utilized to measure joints of a patient and to monitor swelling of patient joints over time. The second tape measure 30 may have many uses, as would be understood by those skilled in the art. The second measuring tape 30 may have virtually any length, width, style, color, measuring units, etc.

The second measuring tape second end 30b is attached to an actuator 34 that is slidably disposed within the slot 18 and that is movable along the slot 18. Accordingly, movement of the actuator 34 along the slot 18 in the direction indicated as $D_1$ causes the loop 32 to expand. Movement of the actuator 34 along slot 18 in the opposite direction indicated as $D_2$ causes the loop 32 to contract.

To facilitate measurement of the circumference of an object via the second measuring tape loop 32, indicia indicating units of incremental length 35 can be disposed on the housing surface 12a adjacent to the slot 18, as illustrated. A pointer 36 can be disposed on the actuator 34 that indicates circumference of an object measured by the second measuring tape loop 32. The pointer 36 and length indicia 35 make it easier for a user to determine the circumference of an object, compared with reading the second measuring tape 30 directly. Embodiments of the present invention, however, do not require a pointer 36 and length indicia 35 on the housing 12.

Figure 2:
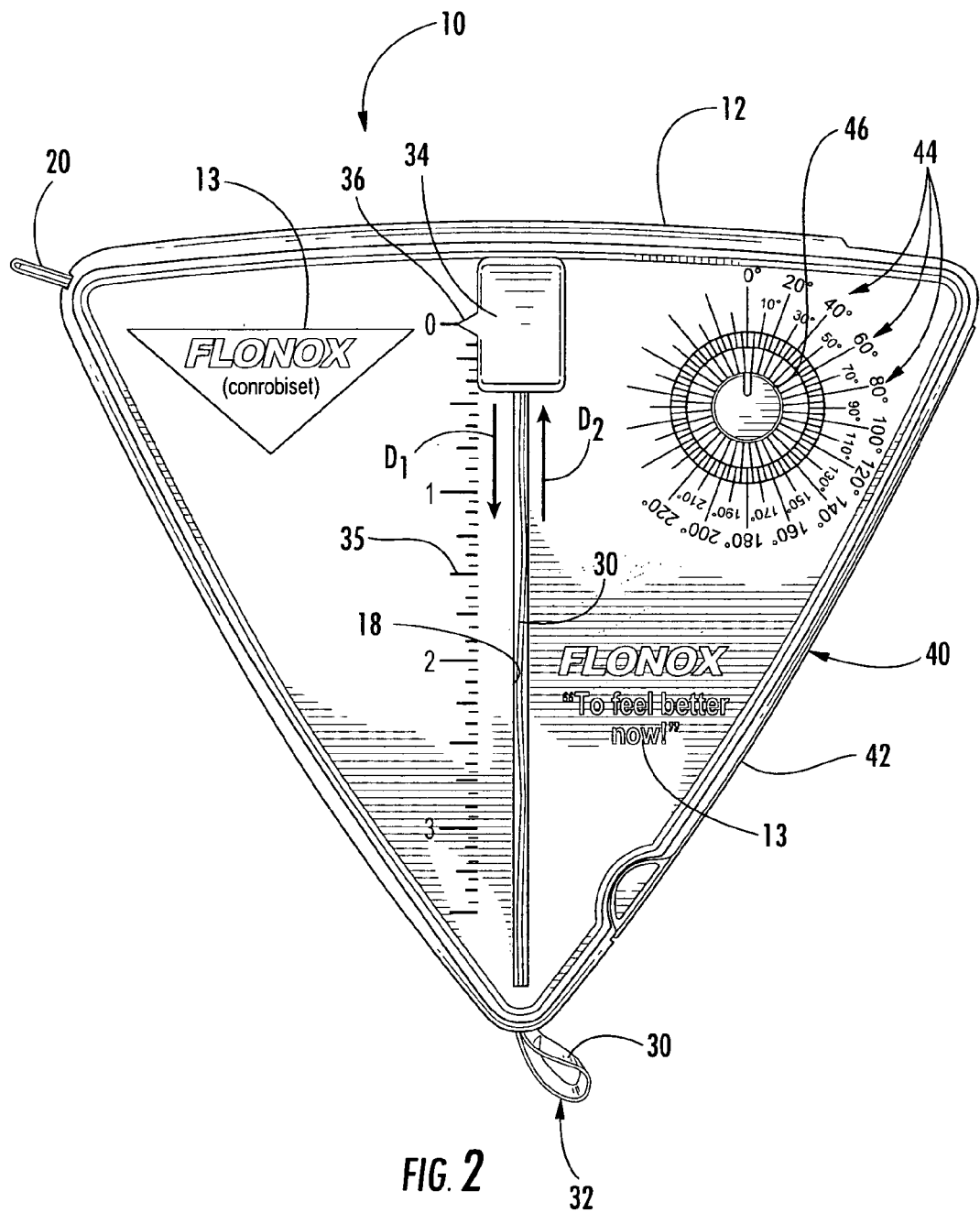
FIG. 2 is a front plan view of the apparatus of FIG. 1.
Figure 3:
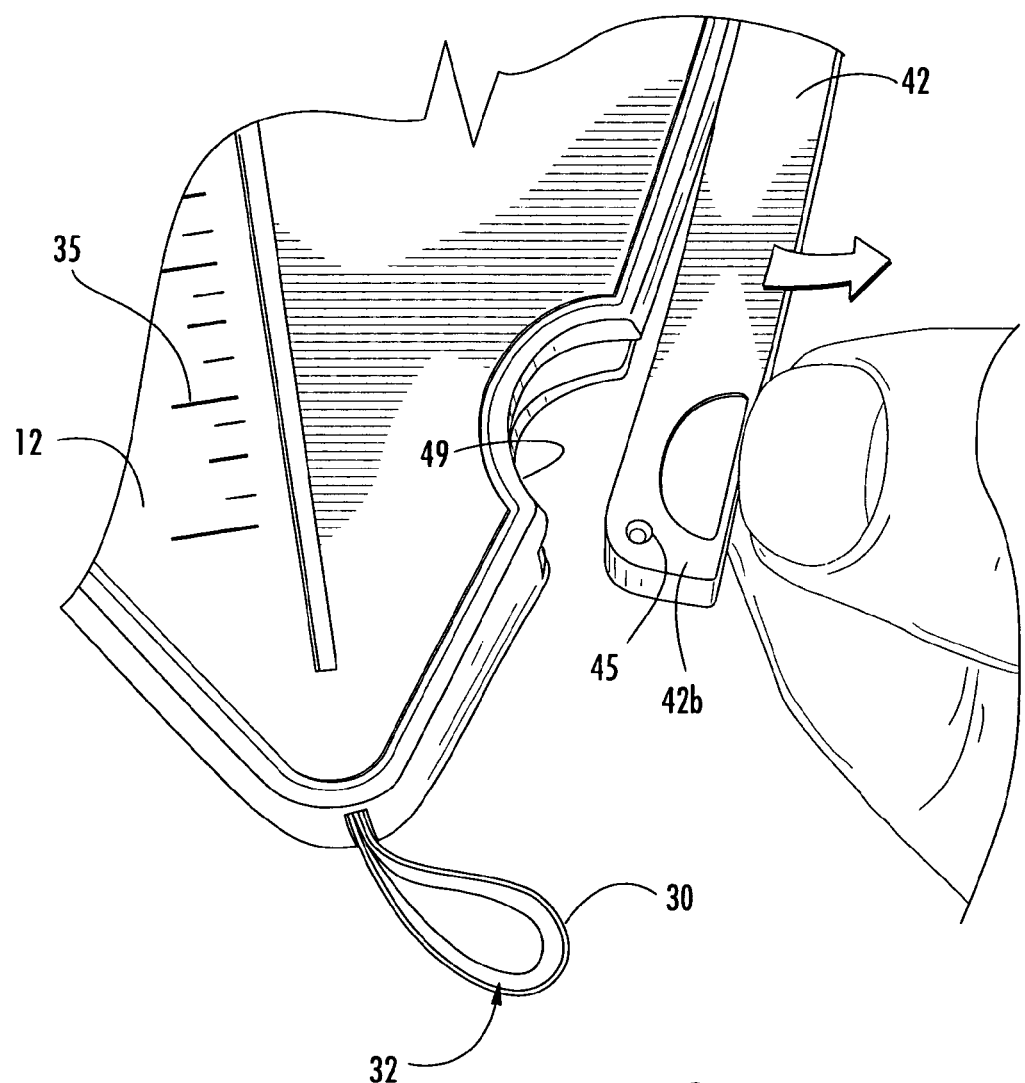
FIG. 3 is an enlarged partial perspective view of the apparatus of FIG. 1 that illustrates the distal free end of the goniometer arm.
Figure 4:
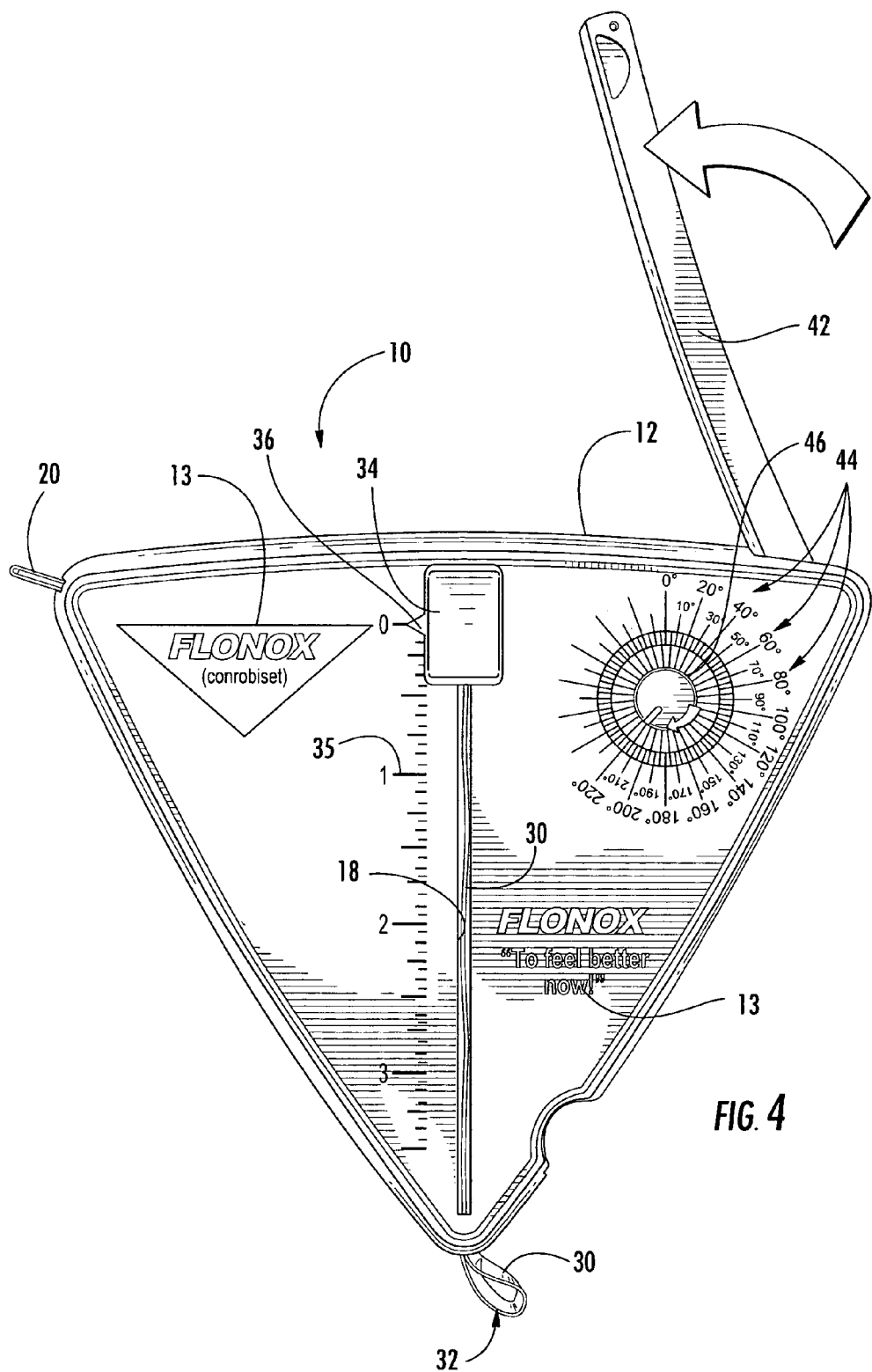
FIG. 4 is a front plan view of the apparatus of FIG. 1 with the goniometer arm in a fully extended orientation.

In the illustrated embodiment, the apparatus 10 also includes a goniometer 40 that is pivotably secured to the housing 12 and movable between a stored position and a plurality of operative positions. As known to those skilled in the art, a goniometer is an instrument used to measure angles. In the medical field, goniometers are used to measure angles of movement for patient limbs, joints, etc. The illustrated goniometer 40 includes an arm 42 that has a proximal end 42a pivotably secured to the housing 12 and a distal free end 42b. The arm 42 is rotatable about a first axis $A_1$ within a range of angular positions. When in a stored configuration, the arm 42 is substantially flush with an edge portion of the housing 12, as illustrated in FIG. 2.

In the illustrated embodiment, the arm 42 is substantially flush with an edge portion of the housing 12 when in the stored position. The arm free end 42b includes a recessed portion or dimple 45 that is configured to releasably engage with a detent extending from the housing 12 and that is configured to releasably retain the arm 42 in the stored position. However, various ways of releasably engaging the arm 42 in a stored position may be utilized, as would be understood by those skilled in the art. Also, in the illustrated embodiment, the housing edge portion includes an indented portion 49 that is configured to allow a user to grip the arm 42 and pivot the arm 42 to one or more operative positions.

Angle scale indicia 44 is disposed on the housing 12 as illustrated. A pointer 46 extends from the housing 12 adjacent the angle scale indicia 44 and is rotatable about a second axis $A_2$. The pointer 46 is operably connected with the arm 42 via a plurality of gears 43a, 43b, 43c, 43d (FIG. 5) such that pivotal movement of the arm 42 causes rotational movement of the pointer 46 which thereby indicates the angular displacement of the arm 42 via the angle scale indicia 44. In the illustrated embodiment, gears 43a, 43b, 43c, 43d lie in substantially the same plane and rotate about respective parallel axes. For example, the first and second axes $A_1$ and $A_2$ are substantially parallel. However, various ways of rotationally coupling the arm 42 and pointer 46 may be utilized without limitation.

Figure 8:
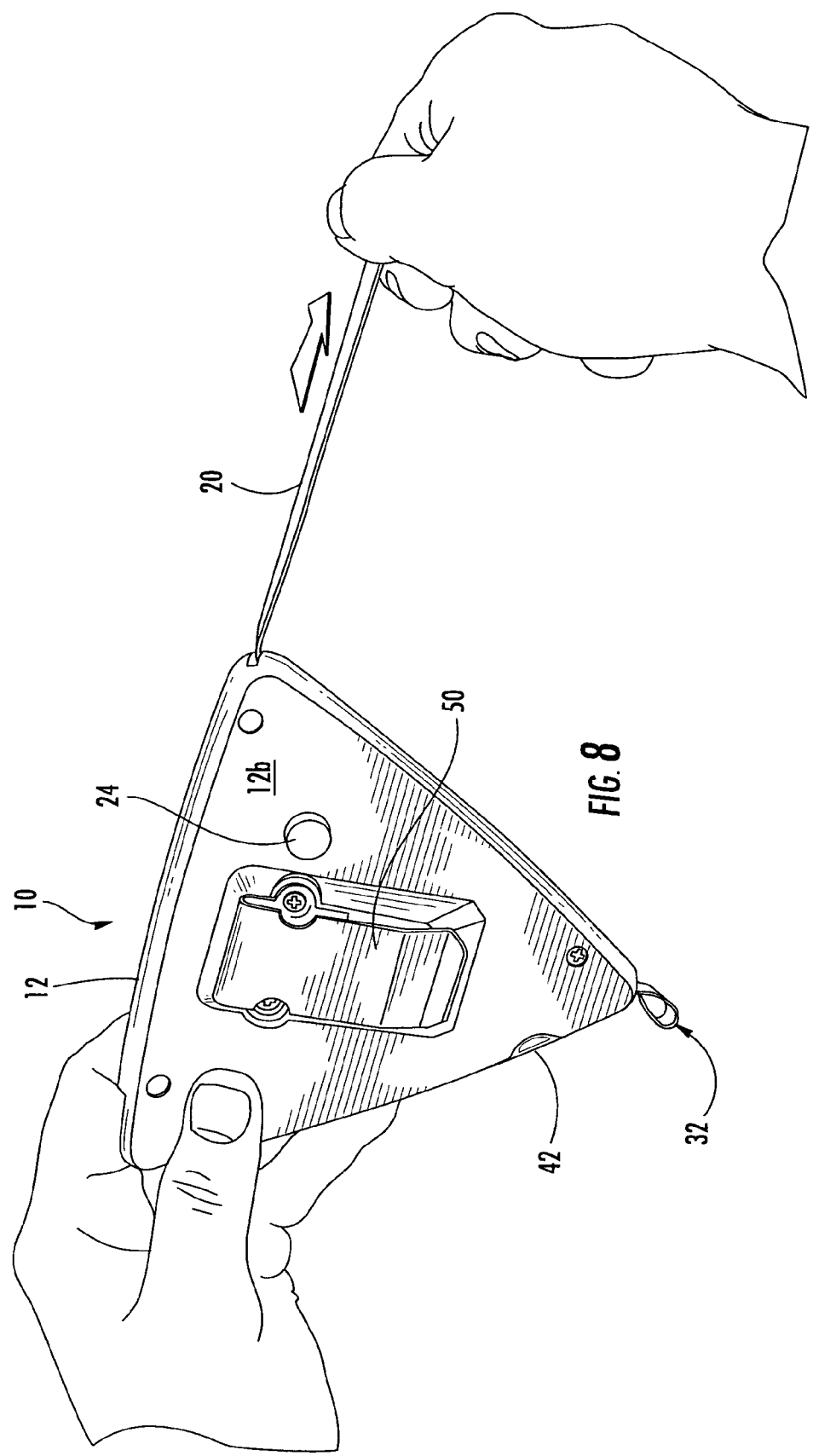
FIGS. 8–9 are rear perspective views of the apparatus of FIG. 1 illustrating operation of a retractable tape measure, according to embodiments of the present invention.
Figure 9:
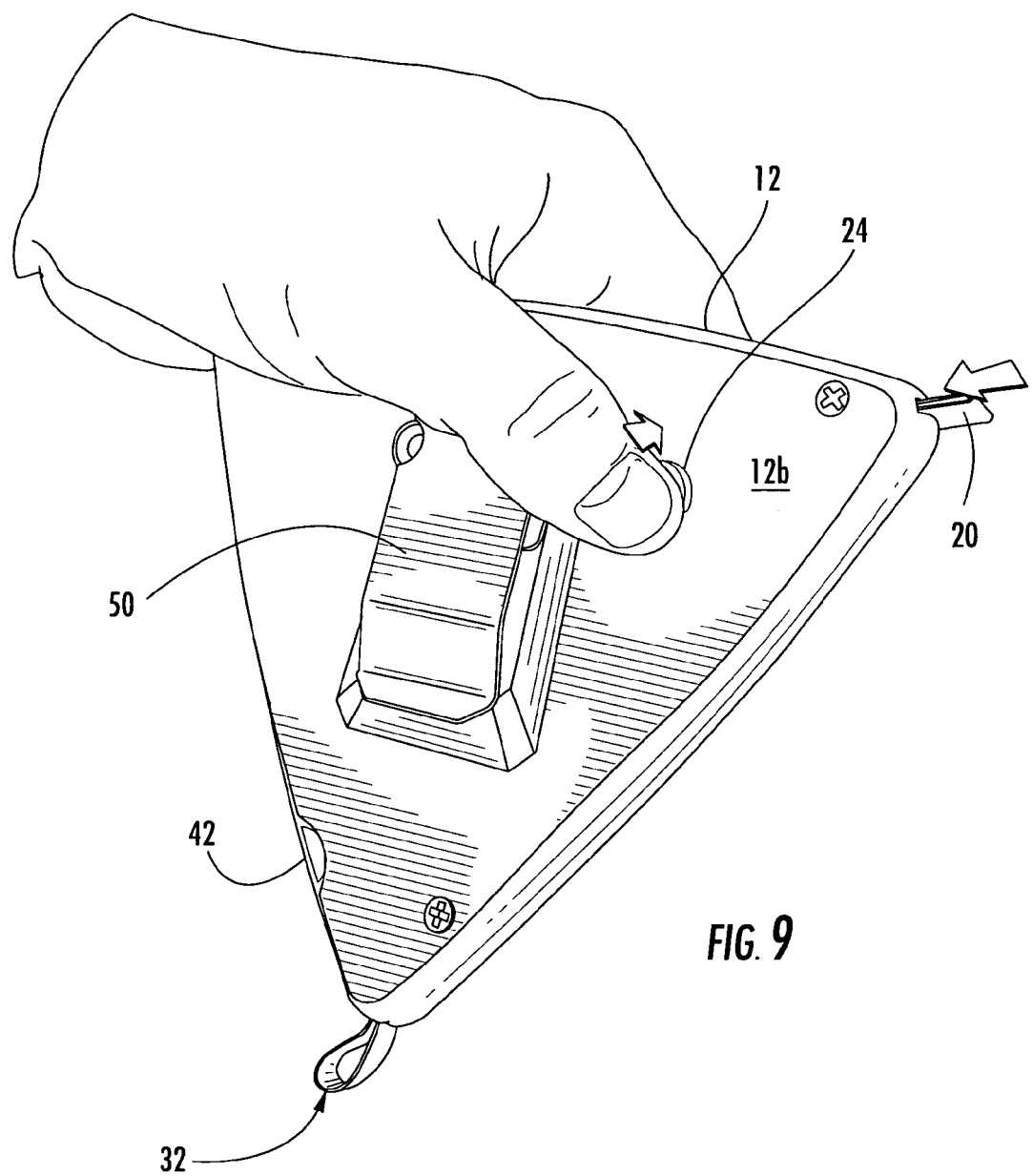

Referring to FIGS. 8–9, the illustrated apparatus 10 also includes a clip 50 attached to a rear surface 12b of the housing 12. The clip 50 is configured to removably attach the apparatus 10 to various objects including, but not limited to, belts, pockets, waistbands of pants and skirts, purse straps, notebooks, and the like. Preferably, the clip 50 has a sufficiently high clamping force to ensure that the apparatus 10 cannot become easily unattached from an object. Various types of devices can be utilized to clamp the apparatus 10 to objects. Embodiments of the present invention are not limited to the illustrated clamp 50.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. An apparatus, comprising:
 a housing having an opening;
 a measuring tape disposed within the housing, wherein the measuring tape is retractably extendable from the housing via the opening; and
 a goniometer pivotably secured to the housing, wherein the goniometer comprises:
  an elongated arm having a proximal end pivotably secured to the housing and a distal free end, wherein the arm is rotatable about a first axis within a range of angular positions;
  angle scale indicia disposed on the housing; and
  a pointer extending from the housing adjacent the angle scale indicia and rotatable about a second axis, wherein the pointer is operably connected with the arm such that pivotal movement of the arm causes rotational movement of the pointer such that the pointer indicates angular displacement of the arm via the angle scale indicia, and wherein the arm and pointer are operably connected via a series of interconnected gears.

2. The apparatus of claim 1, wherein the housing has a polygonal shape with a corner, and wherein the opening in the housing is located at the corner.

3. The apparatus of claim 1, wherein the housing is generally triangular-shaped.

4. The apparatus of claim 1, wherein the housing comprises promotional indicia thereon.

5. The apparatus of claim 1, wherein the first and second axes are substantially parallel.

6. The apparatus of claim 1, wherein the arm is substantially flush with an edge portion of the housing when in a stored position.

7. The apparatus of claim 1, further comprising a clip attached to the housing that is configured to removably attach the apparatus to an object.

8. The apparatus of claim 1, wherein the housing comprises a second opening formed therein, wherein a first end of a second measuring tape is fixed to the housing and an opposite second end of the measuring tape is movable within the housing such that a portion of the second measuring tape between the first and second ends thereof extends from the housing and forms a loop that is retractably expandable and that is configured to measure a circumference of an object.

9. The apparatus of claim 8, wherein the housing comprises an elongated slot formed therein, wherein an actuator is slidably disposed within the slot and movable along the slot, wherein the actuator is attached to the second measuring tape second end, and wherein movement of the actuator along the slot retracts and expands the loop to facilitate measuring an object circumference.

10. The apparatus of claim 9, further comprising:
 indicia indicating units of incremental length disposed on the housing adjacent to the slot; and
 a pointer disposed on the actuator, wherein the pointer indicates circumference of an object measured by the loop.

11. The apparatus of claim 8, wherein the housing has a polygonal shape with first and second corners, wherein the first opening is in the first corner and the second opening is in the second corner.

12. An apparatus, comprising:
 a housing having first and second openings and an elongated slot formed therein;
 a first measuring tape disposed within the housing, wherein the first measuring tape is retractably extendable from the housing via the first opening;
 a second measuring tape disposed within the housing, wherein a first end of the second measuring tape is fixed to the housing and an opposite second end of the measuring tape is movable within the housing such that a portion of the second measuring tape between the first and second ends thereof extends from the housing via the second opening and forms a loop that is retractably expandable and that is configured to measure a circumference of an object; and
 an actuator slidably disposed within the slot and movable along the slot, wherein the actuator is attached to the second measuring tape second end, and wherein movement of the actuator along the slot retracts and expands the loop to facilitate measuring an object circumference.

13. The apparatus of claim 12, wherein the housing has a polygonal shape with first and second corners, wherein the first opening is located at the first corner and the second opening is located at the second corner.

14. The apparatus of claim 12, wherein the housing is generally triangular-shaped.

15. The apparatus of claim 12, wherein the housing comprises promotional indicia thereon.

16. The apparatus of claim 12, further comprising a clip attached to the housing that is configured to removably attach the apparatus to an object.

17. The apparatus of claim 12, further comprising:
indicia indicating units of incremental length disposed on the housing adjacent to the slot; and
a pointer disposed on the actuator, wherein the pointer indicates circumference of an object measured by the loop.

18. An apparatus, comprising:
a housing having an opening and an elongated slot formed therein;
a goniometer pivotably secured to the housing; and
a measuring tape disposed within the housing, wherein a first end of the measuring tape is fixed to the housing and an opposite second end of the measuring tape is movable within the housing such that a portion of the measuring tape between the first and second ends thereof extends from the housing via the second opening and forms a loop that is retractably expandable and that is configured to measure a circumference of an object; and
an actuator slidably disposed within the slot and movable along the slot, wherein the actuator is attached to the measuring tape second end, and wherein movement of the actuator along the slot retracts and expands the loop to facilitate measuring an object circumference.

19. The apparatus of claim 18, wherein the housing has a polygonal shape with a corner, and wherein the opening in the housing is located at the corner.

20. The apparatus of claim 18, wherein the housing is generally triangular-shaped.

21. The apparatus of claim 18, wherein the housing comprises promotional indicia thereon.

22. The apparatus of claim 18, further comprising: indicia indicating units of incremental length disposed on the housing adjacent to the slot; and
a pointer disposed on the actuator, wherein the pointer indicates circumference of an object measured by the loop.

23. The apparatus of claim 18, wherein the goniometer comprises:
an arm having a proximal end pivotably secured to the housing and a distal free end, wherein the arm is rotatable about a first axis within a range of angular positions;
angle scale indicia disposed on the housing; and
a pointer extending from the housing adjacent the angle scale indicia and rotatable about a second axis, wherein the pointer is operably connected with the arm such that pivotal movement of the arm causes rotational movement of the pointer such that the pointer indicates angular displacement of the arm via the angle scale indicia.

24. The apparatus of claim 23, wherein the first and second axes are substantially parallel.

25. The apparatus of claim 23, wherein the arm is substantially flush with an edge portion of the housing when in a stored position.

26. The apparatus of claim 23, wherein the arm and pointer are operably connected via a series of interconnected gears.

27. The apparatus of claim 18, further comprising a clip attached to the housing that is configured to removably attach the apparatus to an object.

28. An apparatus, comprising:
a housing having first and second openings and an elongated slot formed therein;
a first measuring tape disposed within the housing, wherein the first measuring tape is retractably extendable from the housing via the first opening;
a second measuring tape disposed within the housing, wherein a first end of the second measuring tape is fixed to the housing and an opposite second end of the measuring tape is movable within the housing such that a portion of the second measuring tape between the first and second ends thereof extends from the housing via the second opening and forms a loop that is retractably expandable and that is configured to measure a circumference of an object;
an actuator slidably disposed within the slot and movable along the slot, wherein the actuator is attached to the second measuring tape second end, and wherein movement of the actuator along the slot retracts and expands the loop to facilitate measuring an object circumference; and
a goniometer pivotably secured to the housing, comprising:
an arm having a proximal end pivotably secured to the housing and a distal free end, wherein the arm is rotatable about a first axis within a range of angular positions;
angle scale indicia disposed on the housing; and
a pointer extending from the housing adjacent the angle scale indicia and rotatable about a second axis, wherein the pointer is operably connected with the arm such that pivotal movement of the arm causes rotational movement of the pointer such that the pointer indicates angular displacement of the arm via the angle scale indicia.

* * * * *